March 18, 1969  T. A. PACKARD  3,433,318
POWERED STEERABLE WHEEL AND SUSPENSION MEANS FOR VEHICLES
Filed March 16, 1967  Sheet 1 of 3

INVENTOR.
THEODORE A. PACKARD
BY
Wm. H. Dean

March 18, 1969   T. A. PACKARD   3,433,318
POWERED STEERABLE WHEEL AND SUSPENSION MEANS FOR VEHICLES
Filed March 16, 1967   Sheet 3 of 3
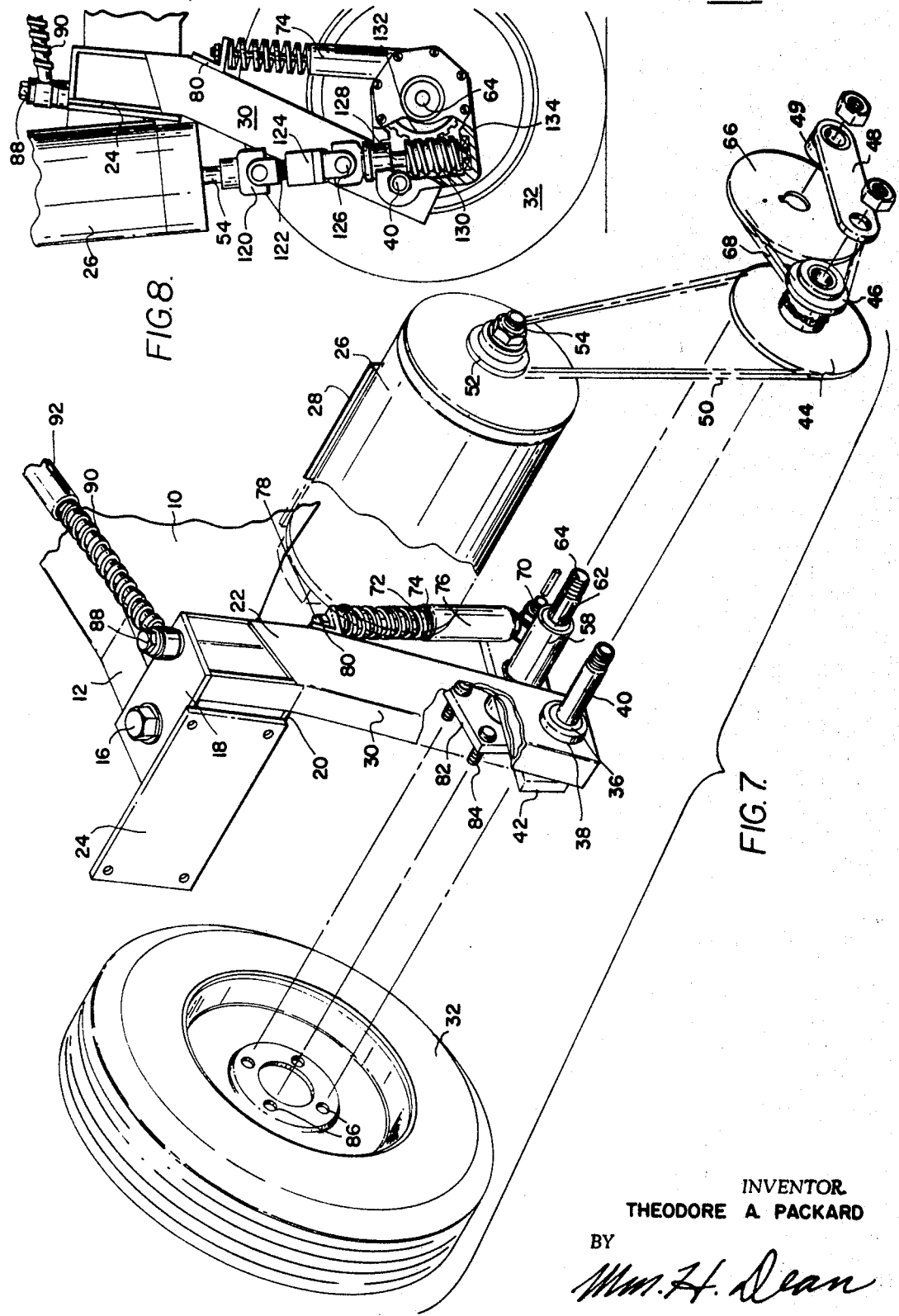
INVENTOR.
THEODORE A. PACKARD
BY
Wm. H. Dean

United States Patent Office 3,433,318
Patented Mar. 18, 1969

3,433,318
POWERED STEERABLE WHEEL AND SUSPENSION MEANS FOR VEHICLES
Theodore A. Packard, 2711 W. Coulter,
Phoenix, Ariz. 85017
Filed Mar. 16, 1967, Ser. No. 623,766
U.S. Cl. 180—26     2 Claims
Int. Cl. B62d 61/06, 7/00

ABSTRACT OF THE DISCLOSURE

A powered steerable wheel and suspension means for vehicles, wherein a wheel suspension strut is pivotally steerable on a substantially vertical axis, and a swing arm is pivotally and resiliently mounted on a lower portion of the strut to carry a wheel hub to thereby provide resilient suspension of the wheel relative to the strut, and motor drive means, also carried on the steerable strut and coupled by rotary drive means to the wheel for driving the same.

Background of the invention

The prior art includes various independently steerable wheels and suspension systems, and also independently powered wheels however, there has been a definite need for a powered steerable wheel and suspension means which permit steering of a wheel on a substantially vertical axis, while at the same time, the wheel is independently powered by a motor carried on a steerable structure or strut, supporting the wheel, and wherein the wheel resiliently sprung relative to the strut.

It has been a problem to provide very simple, single, wheel drive mechanisms for small vehicles, such as electrically powered vehicles used for small delivery trucks, or the like. While these vehicles require motive power, they also require a powered steerable wheel which is resiliently sprung. Electrically powered vehicles utilizing two rear wheels and a single front wheel are ideally equipped to employ a powered steerable wheel, however, prior art devices have not included adequate mechanisms to provide for the steering and drive mechanism, as well as resilient suspension mechanism, which is compact, economical, and durable.

Summary of the invention

The powered steerable wheel and suspension means of the present invention employs a wheel strut assembly, which is pivotally steerable about a substantially vertical axis. This assembly carries a drive motor, which is adapted to drive a wheel resiliently sprung relative to the lower portion of the steerable strut assembly. The wheel is mounted on a swing arm pivotally connected and mounted on the strut assembly, about a first pivot axis means. The wheel is provided with a hub rotatably mounted about a wheel axis means carried by the swing arm and spaced from the first pivot axis means. Rotary drive means interconnects the driving motor carried on the strut assembly and the wheel. Portions of the rotary drive means may have rotary axis on said first pivot axis means, and said wheel axis means to thereby permit resilient suspension of the swing arm mechanism at its upwardly and downwardly pivoted end adjacent to which said wheel axis means is mounted.

Said means of the invention being, such that the wheel may be readily disconnected from the wheel hub without disturbing any other portion of the mechanism, and in this manner the wheel is readily removable from one side of the mechanism of the invention simply by removing a set of conventional wheel lug bolts. Additionally the invention comprises a novel disc brake mechanism, including a disc operable by the motor carried on the strut assembly, which through a reduction ratio of the related drive means, provides efficient braking action for braking rotation of the wheel of the invention. The rotary drive means of the invention may conveniently be a chain and sprocket or other equivalent rotary drive mechanisms.

Accordingly, it is an object of the present invention to provide a novel, powered, steerable wheel and suspension means wherein a steerable powered wheel comprises a strut steerable about a vertical axis and carrying a motor as well as rotary drive means and suspension means, which resiliently suspends the wheel for vertical movement relative to the strut.

Another object of the invention is to provide a novel powered steerable wheel and suspension means, which may be used on single wheel drive vehicles or multiple wheel drive vehicles.

Further objects and advantages of the invention may be apparent from the following specification, appended claims, and accompanying drawings.

Brief description of the drawings

FIG. 7 is an exploded view of the powered steerable wheel and suspension means of the invention; and FIG. 8 is a fragmentary side elevational view of the invention showing a modification thereof, and further showing parts and portions broken away and in section to amplify the illustration.

Description of the preferred embodiments

Figure 2:
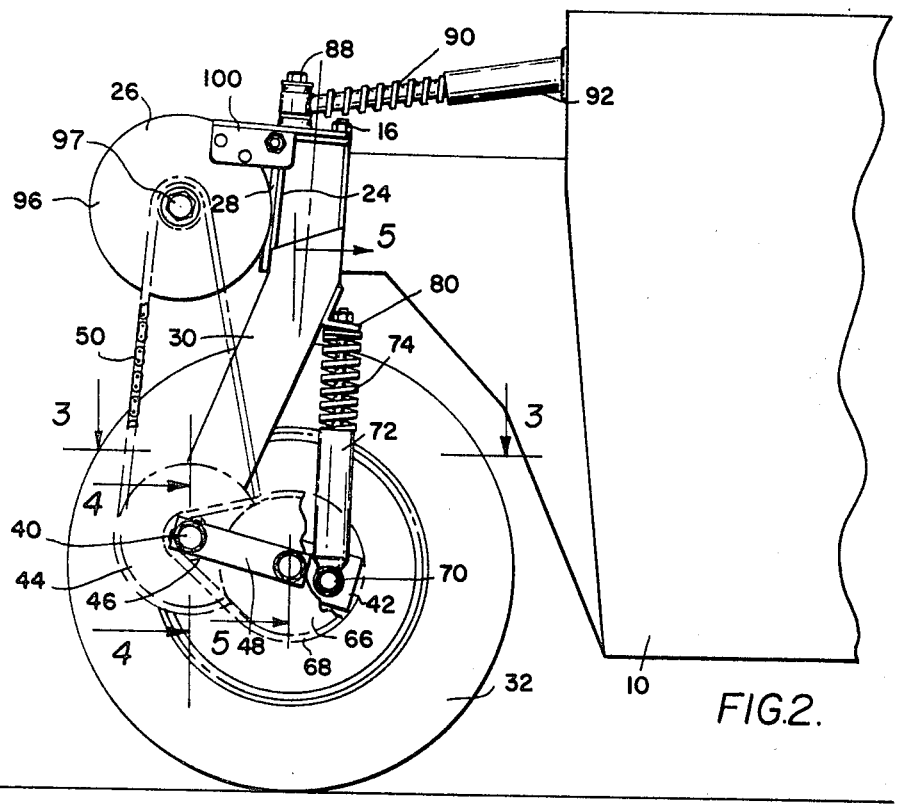
FIG. 2 is a side elevational view thereof showing fragmentarily a frame with which the mechanism of the invention is connected.

As shown best in FIGS. 2 and 7 of the drawings, the powered steerable wheel and suspension means of the invention may be connected to any suitable frame 10. The invention may be used as a front drive and suspension wheel for a three wheeled vehicle, or may be used for multiple wheel drive vehicles, such that the mechanism of the invention may be used to provide a four wheel drive vehicle, if desired.

A forward portion 12 of the frame 10 is provided with a strut supporting portions, through which a vertical axis bolt 16 extends. This bolt extends through upper and lower plates 18 and 20 of a wheel strut assembly 22, the plates 18 and 20 being disposed above and below lower portions of the forward portion 12 of the frame 10.

Figure 5:
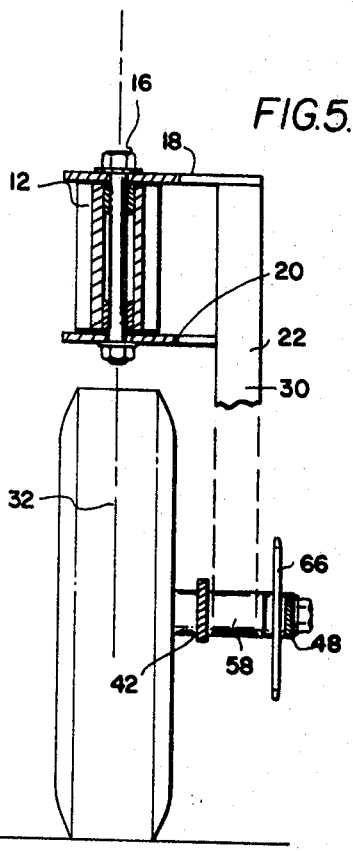
FIG. 5 is an enlarged fragmentary sectional view taken from the line 5—5 of FIG. 2.

Mounted on the plates 18 and 20 is a motor mount 24 carrying a motor 26 having a mount base 28 bolted to the mount 24. Thus, the motor together with the strut assembly 22 pivots about the axis of the bolt 16 which is generally verical but may be tilted at a slight angle, as desired. As shown in FIGURE 5 of the drawings, the strut assembly comprises a substantially vertically disposed and downwardly extending strut element 30, which is offset laterally relative to the axis of the bolt 16 to permit the center path of the wheel 32 to be substantially aligned with the axis of the bolt 16 about which the strut assembly 22 pivots.

Figure 4:
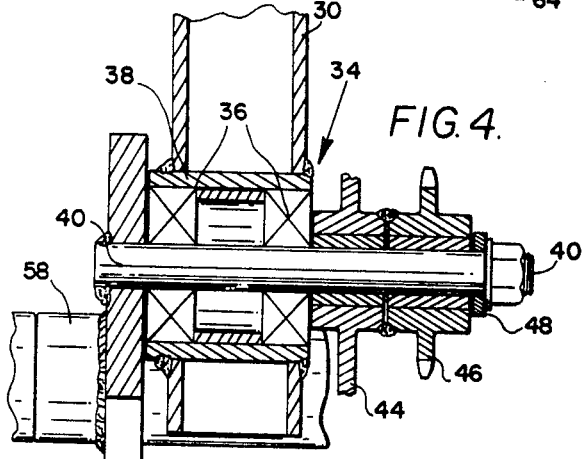
FIG. 4 is an enlarged fragmentary sectional view taken from the line 4—4 of FIG. 2, showing the parts and portions in elevation to facilitate the illustration.

As shown in FIGURES 2, 4 and 7, a lower end of the strut member 30 carries a first pivot axis means, generally indicated at 34 in FIG. 4 of the drawings. This first pivot avis means comprises a pair of bearings 36 retained in a tubular structure 38 fixed to the strut member 30. A shaft 40 is carried by the bearings 36, and fixed to this shaft 40 is a swing arm 42, which extends generally rearward from the strut member 30. Fixed to the shaft 40 are a pair of sprockets 44 and 46. A forward end of a swing link, designated 48, is carried by the shaft 40, as shown best in FIGS. 2, 4 and 7 of the drawings. Engaging the sprocket 44 is a chain 50, which also engages a sprocket 52, on the shaft 54 of the motor 26. Thus, the sprockets 44 and 52, together with the chain 50, constitute a rotary drive means extending from the motor 26 to the first pivot axis means 34.

Figure 3:
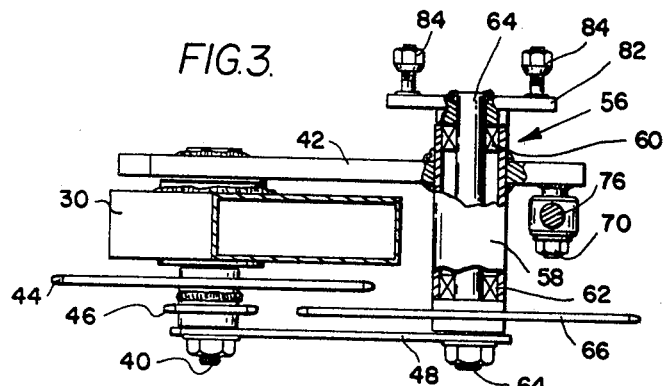
FIG. 3 is an enlarged fragmentary plan sectional view taken from line 3—3 of FIG. 2, showing portions further broken away and in section to amplify the illustration.

As shown best in FIGURES 2, 3 and 7, a wheel axis means, generally indicated at 56 is connected to a rearward portion of the swing arm 42. This wheel axis means comprises a bearing holding sleeve 58, wherein bearings 60 and 62 support a hub shaft 64, this shaft being rotatably mounted in the sleeve 58 by means of the bearings 60 and 62.

A sprocket 66 is fixed to the shaft 64 at one end of the sleeve 58, and a chain 68 engages the sprocket 66 and also the sprocket 46, hereinbefore described. Thus, the sprocket 46, chain 68, and sprocket 66 constitute a rotary drive means extending from the first pivot axis means 34 to the hub axis means 56.

The swing link 48 at its rearward end is mounted on the shaft 64 to maintain proper spaced relationship between the shafts 64 and 40.

A coil spring mechanism is pivotally connected to the rear end of the swing arm 42 by means of an extending trunnion 70. This coil spring mechanism is designated 72, and comprises a coil spring 74, together with a suitable telescopic guide 76, and a telescopic plunger shaft 78, coupled by a bracket 80 to the strut member 30 above the rear end of the swing arm 42. Thus, the coil spring 74 tends resiliently to resist upward movement of the swing arm 42 about the first pivot axis means 34, and the axis of the shaft 40, and thus provide for resilient action of the wheel 32 as it moves over uneven surfaces.

Secured to the shaft 64 is a hub plate 82 having lug bolts 84 projecting therefrom. These lug bolts 84 are engageable in corresponding openings 86 in the disc portion of the wheel 32. It will be seen that the wheel hub connection is thus at the opposite side of the strut member 30 from the rotary drive means, including the chain and sprocket mechanism of the invention, so that the wheel may be readily removed for changing a tire without disturbing any of the drive mechanism. It will be appreciated that the offset relation of the strut member 30 with relation to the pivotal axis of the vertical pivot axis bolt 16 permits steering of the wheel generally about a center of its path.

Pivotally connected to the strut assembly, at its upper end, is a steering pivot bolt 88 to which a steering screw 90 is pivotally connected. This steering screw 90 is adapted to pivot the strut assembly about the axis of the bolt 16 to provide for pivotal steering of the wheel 32 about a vertical axis in relation to the frame 10. It will be appreciated that as the screw 90 is rotated in a fixed nut 92, that the screw 90 will be axially extended or retracted in order pivotally to move the strut member 30, and the strut assembly about the pivotal axis of the bolt 16.

Figure 1:
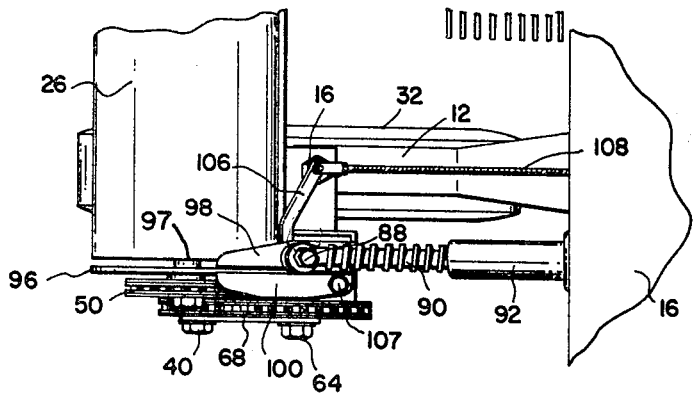
FIG. 1 is a fragmentary top or plan view of a powered steerable wheel and suspension means, in accordance with the present invention.
Figure 6:
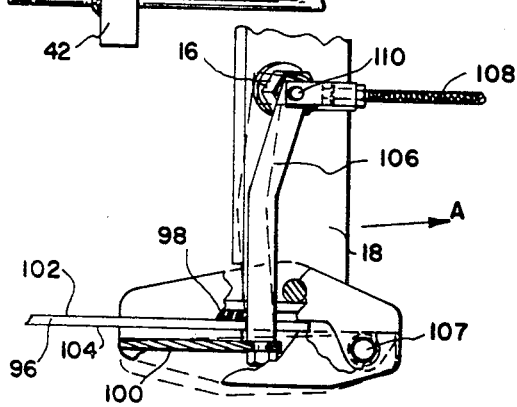
FIG. 6 is a fragmentary plan view of the brake control mechanism of the invention showing portions thereof broken away and in section to amplify the illustration.

As shown in FIGS. 1, 2 and 6 of the drawings, a brake mechanism of the invention comprises a disc 96 fixed to the shaft 97 of the motor 26. This disc 96 is engageable at opposite sides thereof by clamp shoes 98 and 100, shown best in FIGS. 1 and 6 of the drawings. The clamp shoe 98 is adapted to engage one side 102 of the disc 96, while the clamp shoe 100 is adapted to engage a side 104 of the disc 96.

A lever 106 is connected to the clamp shoe 100 to move it about a bolt 107, and to pivot it into firm engagement with the side 104 of the disc 96. The disc 96 being capable of moving slightly toward the shoe 98, which is fixed, provides for clamping of the disc 96 at opposite sides thereof, when tension is applied to a cable 108 to pivot the arm 106 generally in the direction of an arrow A, shown in FIG. 6 of the drawings.

The attachment of the cable 108 is by means of a pivot pin 110, which may align approximately with the axis of the bolt 16 in order to provide substantially a constant length of the cable 108 relative to the various dispositions of the lever 106, as the strut 30 is pivoted around the axis of the bolt 16.

In operation, the strut assembly of the invention pivots about the bolt 16 for steering of the wheel 32, while the spring 74 provides for resilient up and down movement of the wheel 32 relative to the strut arm 30 and frame 10, and a rotary drive means comprising the chain and sprocket mechanism, hereinbefore described, permits uniform driving action of the wheel 32 during its upward and downward movement in connection with the swing arm 42 and swing link 48, all as hereinbefore described.

As shown in FIG. 8 of the drawings, the modification of the present invention comprises a mounting of the motor 26 on the motor mount 24, but on an axis more nearly vertical than horizontal, such that the shaft 54 of the motor is directed downwardly. The shaft 54 carries a universal joint 120 to which is connected a spline stub 122. The spline stub 122 is slidably mounted in an internally splined yoke 124 coupled to a second universal joint 126, which is mounted on a pinion shaft 128 carrying a worm pinion 130. The worm pinion 130 meshes with a worm wheel 132 carried by the wheel shaft 64. The mechanism of the modification is similar to that hereinbefore described, except that the link 48 is replaced by a gear housing 134 which encloses the worm pinion 130 and the worm wheel 132.

The arm 42, hereinbefore described, is disposed on the opposite side of the strut 30 from the housing 134, and the shock strut 74 is similar to that as hereinbefore described.

In operation, the motor 26 revolves its shaft 54 together with the universal joints 120 and 126. Upward and downward pivotal movement of the gear case 134 causes the spline yoke portion 124 to slide axially on the spline stub 122, while the spline stub 122 is imparting rotary motion to the yoke 124. As the yoke 124 transmits rotary motion to the universal 126, it drives the shaft 128 and the worm pinion 130, which in mesh with the worm wheel 132, drives shaft 64.

The shock strut 74 resiliently resists upward pivotal movement of the shaft 64, as hereinbefore described. It will be understood by those skilled in the art, that this particular rotary drive means is substantially quieter in operation, than a chain drive means, as hereinbefore described, particularly at higher speeds.

It will further be understood by those skilled in the art, that the rotary drive means of the modification of the invention, shown in FIG. 8 of the drawings, is an equivalent to the rotary drive means disclosed in FIGS. 1 to 7 inclusive, of the drawings.

It will be obvious to those skilled in the art that various modifications of the present invention may be resorted to without departing from the spirit of the invention.

I claim:

1. In a powered steering wheel and suspension means, the combination of: a main frame; a wheel strut assembly having forward travelling direction and pivotally mounted on said main frame on a substantially vertical axis; a motor carried on said strut assembly; first pivot axis means carried by said strut assembly below the pivotal mounting of said strut assembly on said main frame; a swing arm pivotally mounted on said first pivot axis means; a wheel axis means carried by said swing arm in spaced relation to said first pivot axis means; a wheel hub rotatably mounted about said wheel axis means on said swing arm; a wheel removably mounted on said hub; resilient suspension and support means connecting said swing arm to said wheel strut assembly, and adapted to resist pivotal movement of said swing arm upwardly about said first pivot axis means; first rotary drive means coupled to said hub, and operable about said wheel axis means; said first rotary drive means comprising a worm wheel; a worm pinion in mesh therewith; said swing arm comprising a housing surrounding said worm wheel, and said worm pinion; and spline yoke and universal coupling means interconnecting said worm pinion and said motor, said wheel axis means spaced rearward with respect to said first pivot axis means to allow said wheel axis means to follow said first pivot axis means when said strut assembly is moving in said forward traveling direction; said resilient suspension and support means pivotally connected to said swing arm rearwardly with respect to said wheel axis means.

2. The invention, as defined in claim 1, wherein: said spline yoke and universal coupling means having splined drive structure slidable axially with relation to the shaft of said motor and said worm pinion, whereby said worm pinion may move toward and away from said motor during operation thereof.

References Cited

UNITED STATES PATENTS

| | | |
|---|---|---|
| 1,139,622 | 5/1915 | Yordi. |
| 3,302,739 | 2/1967 | Beck et al. _____ 180—65 X |

FOREIGN PATENTS

| | | |
|---|---|---|
| 481,661 | 3/1938 | Great Britain. |
| 527,402 | 7/1921 | France. |
| 528,113 | 8/1921 | France. |
| 575,113 | 5/1959 | Canada. |
| 696,225 | 9/1940 | Germany. |
| 23,069 | 1909 | Great Britain. |

A. HARRY LEVY, *Primary Examiner.*

U.S. Cl. X.R.

180—13, 31, 48, 52, 65